(12) United States Patent
Niu et al.

(10) Patent No.: US 11,337,078 B2
(45) Date of Patent: May 17, 2022

(54) UPLINK DATA TRANSMISSION METHOD AND APPARATUS AND STORAGE MEDIUM

(71) Applicant: XI'AN ZHONGXING NEW SOFTWARE CO., LTD., Xi'an (CN)

(72) Inventors: Li Niu, Shenzhen (CN); Yumin Wu, Shenzhen (CN)

(73) Assignee: Xi'An Zhongxing New Software Co., Ltd., Shaanxi (CN)

( * ) Notice: Subject to any disclaimer, the term of this patent is extended or adjusted under 35 U.S.C. 154(b) by 286 days.

(21) Appl. No.: 16/479,887

(22) PCT Filed: Dec. 13, 2017

(86) PCT No.: PCT/CN2017/115953
§ 371 (c)(1),
(2) Date: Jul. 22, 2019

(87) PCT Pub. No.: WO2018/133590
PCT Pub. Date: Jul. 26, 2018

(65) Prior Publication Data
US 2019/0380042 A1    Dec. 12, 2019

(30) Foreign Application Priority Data
Jan. 20, 2017    (CN) .......................... 201710051704.5

(51) Int. Cl.
*H04W 72/04* (2009.01)
*H04W 16/14* (2009.01)
(Continued)

(52) U.S. Cl.
CPC ........... *H04W 16/14* (2013.01); *H04W 52/36* (2013.01); *H04W 72/0473* (2013.01);
(Continued)

(58) Field of Classification Search
None
See application file for complete search history.

(56) References Cited

FOREIGN PATENT DOCUMENTS

| CN | 102438305 A | 5/2012 |
|---|---|---|
| CN | 103582073 A | 2/2014 |

(Continued)

OTHER PUBLICATIONS

3GPP, "Medium Access Control (MAC) Protocol Specification", 3GPP TS 36.321 V14.0.0 (Sep. 30, 2016).
(Continued)

*Primary Examiner* — Willie J Daniel, Jr.
(74) *Attorney, Agent, or Firm* — Knobbe, Martens, Olson & Bear, LLP

(57) ABSTRACT

Embodiments of the present disclosure disclose an uplink data transmission method and apparatus and a storage medium. The method comprises: a terminal sending uplink data using an unlicensed resource; if the sending of the uplink data using the unlicensed resource fails, sending the uplink data using a licensed resource; the terminal sending a preamble sequence using an unlicensed resource; sending uplink data in a transmission time interval corresponding to a sending moment of the preamble sequence; and if a random access response carrying uplink authorization information is received within a preset period of time, resending the uplink data using a licensed resource indicated by the uplink authorization information. A base station detects the preamble sequence sent by the terminal using the unlicensed spectrum and the uplink data sent by the terminal, and when the preamble sequence is correctly decoded but the uplink data is not correctly decoded, the random access response carrying the uplink authorization information is sent to the terminal within the preset period of time using the licensed resource.

15 Claims, 6 Drawing Sheets

S110

Sending uplink data by using an unlicensed resource

S120 sending the uplink data using a licensed resource in a case that sending the uplink data by using the unlicensed resource fails

(51) Int. Cl.
  *H04W 76/19*   (2018.01)
  *H04W 76/30*   (2018.01)
  *H04W 76/27*   (2018.01)
  *H04W 52/36*   (2009.01)
  *H04W 72/14*   (2009.01)
  *H04W 74/08*   (2009.01)

(52) U.S. Cl.
  CPC ....... *H04W 72/14* (2013.01); *H04W 74/0833* (2013.01); *H04W 76/19* (2018.02); *H04W 76/27* (2018.02); *H04W 76/30* (2018.02)

(56) References Cited

FOREIGN PATENT DOCUMENTS

| | | | | |
|---|---|---|---|---|
| CN | 104540230 A | | 4/2015 | |
| CN | 105722096 A | * | 6/2016 | ............ H04W 36/08 |
| CN | 105722096 A | | 6/2016 | |
| CN | 106162904 A | | 11/2016 | |

OTHER PUBLICATIONS

International Search Report of corresponding PCT Application No. PCT/CN2017/115953—4 pages (dated Feb. 26, 2018).

* cited by examiner

UPLINK DATA TRANSMISSION METHOD AND APPARATUS AND STORAGE MEDIUM

CROSS-REFERENCES TO RELATED APPLICATIONS

This application is a U.S. National Stage Application, filed under 35 U.S.C. 371, of International Patent Application No. PCT/CN2017/115953, filed on Dec. 13, 2017, which claims priority to a Chinese patent application No. 201710051704.5 filed on Jan. 20, 2017, disclosure of which are incorporated herein by reference in their entireties.

TECHNICAL FIELD

The present disclosure relates to the field of wireless communications and, in particular, to uplink data transmission methods and apparatuses, and a storage medium.

BACKGROUND

FIG. 1 is a structural diagram of a Long Term Evolution (LTE) system in the existing art. As shown in FIG. 1, the system mainly includes a user equipment (UE), a core network (CN) and an evolved Node B (eNB). A mobility management entity (MME) in the CN mainly undertakes signaling transmission, and a serving gateway (SGW) mainly undertakes data transmission. An interface between the UE and the eNB is a Uu interface, and an interface between the eNB and the CN is an S1 interface.

As stipulated in the current protocol, the UE needs to access the eNB in order to communicate with the eNB, that is, the UE initiates a random access process. As shown in FIG. 2, a random access using a licensed resource includes four steps described below.

In step S1, the UE sends a preamble sequence to the eNB. Specifically, the UE learns of, through system information or radio resource control (RRC) signaling, available preamble sequence codes and available time-frequency positions at which the preamble sequence is sent which are used for the random access; and the UE randomly selects the preamble sequence and the time-frequency position at which the preamble sequence is sent from available resources and sends the preamble sequence to the eNB.

In step S2, the eNB sends a random access response to the UE. Specifically, the eNB determines, according to the time-frequency position at which the preamble sequence for the random access is sent, an Raccess radio network temporary identity (RA-RNTI) which may be used by the UE, and decodes the preamble sequence with the RA-RNTI. After successfully decoding the preamble sequence, the eNB returns the random access response to the UE. The random access response carries information such as an uplink grant.

In step S3, a transmission is scheduled. The UE sends uplink data by using a licensed uplink resource, where information such as an identifier of the UE is carried in the uplink data.

In step S4, the uplink data is decoded. Specifically, the eNB parses the uplink data on the licensed uplink resource, confirms the UE, resolves a collision, and sends a contention resolution identifier to the UE.

However, the above process requires four steps and has a long delay. As non-orthogonal technology has been approved by various companies, the random access process has been technically updated and simplified into two steps.

The UE may send data to the eNB without a grant. As shown in FIG. 3, the random access process includes two steps described below.

In step S11, the UE sends the preamble sequence, selects an unlicensed resource from unlicensed resources to send the uplink data.

In step S12, the eNB returns a response or data after parsing the uplink data.

Here, the non-orthogonal technology is used by a resource for sending the uplink data. Different from the traditional random access process, unlicensed uplink data may be contended for by multiple users, and its power is also higher than that of the existing physical uplink shared channel (PUSCH). Furthermore, the unlicensed uplink data may also have the problem of high sending failure rate.

SUMMARY

In view of this, embodiments of the present disclosure provide an uplink data transmission method and an uplink data transmission apparatus, and a storage medium, to partially solve at least the preceding problem.

To achieve the preceding object, technical solutions of the present disclosure are implemented as follows:

An embodiment of the present disclosure provides an uplink data transmission method applied to a terminal. The method includes steps described below:

sending uplink data by using an unlicensed resource; and sending the uplink data by using a licensed resource in a case that the sending the uplink data by using the unlicensed resource fails.

Based on the preceding solution, the uplink data is sent by using the unlicensed resource in a manner of incremental target received power, where a target received power of the uplink data in an (n+1)-th transmission is greater than a target received power of the uplink data in an n-th transmission, where n is a positive integer greater than or equal to 1.

Based on the preceding solution, the sending the uplink data by using the unlicensed resource in the manner of incremental target received power includes steps described below: determining a current target received power of the uplink data with the following formula:

$$ReceivedTargetPower = InitialReceivedTargetPower + (TRANSMISSION\_COUNTER - 1) * powerRampingStep;$$

where ReceivedTargetPower is the current target received power, InitialReceiveTargetPower is an initial target received power of the uplink data in a first transmission, TRANSMISSION_COUNTER is a serial number of a current transmission of the uplink data, and powerRampingStep is an incremental step of received power; and sending, according to the current target received power, the uplink data.

Based on the preceding solution, the method further includes a step described below:

receiving a system message, a radio resource control (RRC) signaling or a dedicated message.

The system message, the RRC signaling or the dedicated message carries at least one of the initial target received power or the incremental step of received power.

The RRC signaling includes an RRC connection reconfiguration signaling, an RRC connection release signaling, an RRC connection setup signaling or an RRC connection reestablishment signaling.

Based on the preceding solution, the sending the uplink data by using the licensed resource in the case that the sending the uplink data by using the unlicensed resource fails includes a step described below:

in a case that a transmission condition of the sending the uplink data by using the unlicensed resource satisfies a preset condition, sending the uplink data by using the licensed resource.

Based on the preceding solution, in the case that the transmission condition of the sending the uplink data by using the unlicensed resource satisfies the preset condition, sending the uplink data using the licensed resource includes a step described below:

if a random access response sent by a base station and carrying uplink grant information is received after the uplink data is sent using the unlicensed resource, the uplink data is sent using the licensed resource indicated by the uplink grant information.

Based on the preceding solution, in the case that the transmission condition of the sending the uplink data by using the unlicensed resource satisfies the preset condition, sending the uplink data using the licensed resource further includes a step described below:

if a number of transmissions of the uplink data with the unlicensed resource reaches a preset number, re-initiating a random access and sending the uplink data on the licensed resource.

Based on the preceding solution, the method further includes a step described below:

receiving a system message, an RRC signaling or a dedicated message sent by the base station, where the system message or the RRC signaling carries the preset number, and the RRC signaling includes an RRC connection reconfiguration signaling, an RRC connection release signaling, an RRC connection setup signaling or an RRC connection reestablishment signaling.

Based on the preceding solution, in a case that the transmission condition of the sending the uplink data by using the unlicensed resource satisfies the preset condition, sending the uplink data by using the licensed resource further includes a step described below:

in a case that a previous transmission of the uplink data using the unlicensed resource fails and has a transmit power reaching a power threshold, re-initiating the random access and sending the uplink data by using the licensed resource.

In a second aspect, an embodiment of the present disclosure provides an uplink data transmission method applied to a terminal. The method includes steps described below:

sending a preamble sequence by using an unlicensed resource;

sending uplink data within a transmission time interval corresponding to a moment at which the preamble sequence is sent; and in a case that a random access response carrying uplink grant information is received within a preset period of time, re-sending the uplink data by using a licensed resource indicated by the uplink grant information.

Based on the preceding solution, the method further includes a step described below:

in a case that the random access response or a downlink notification sent by a base station is not received within the preset period of time, re-initiating a random access by using the unlicensed resource or the licensed resource, where the downlink notification is information sent by the base station in successful reception of the preamble sequence and the uplink data.

In a third aspect, an embodiment of the present disclosure provides an uplink data transmission method applied to a base station. The method includes steps described below:

detecting a preamble sequence sent by a terminal by using an unlicensed spectrum;

detecting uplink data sent by the terminal, where the uplink data is sent by the terminal within a transmission time interval corresponding to a moment at which the preamble sequence is sent;

in a case that the preamble sequence is correctly decoded and the uplink data is not correctly decoded, sending a random access response carrying uplink grant information to the terminal by using a licensed resource within a preset period of time, where the uplink grant information is used for indicating the licensed resource scheduled to the terminal; and receiving, on the licensed resource indicated by the uplink grant information, the uplink data sent by the terminal.

In a fourth aspect, an embodiment of the present disclosure provides an uplink data transmission apparatus disposed in a terminal. The apparatus includes a first sending unit and a second sending unit.

The first sending unit is configured to send uplink data by using an unlicensed resource.

The second sending unit is configured to send the uplink data by using a licensed resource in a case that sending the uplink data by using the unlicensed resource fails.

Based on the preceding solution, the first sending unit is configured to send the uplink data by using the unlicensed resource in a manner of incremental target received power, where a target received power of the uplink data in an (n+1)-th transmission is greater than a target received power of the uplink data in an n-th transmission, where n is a positive integer greater than or equal to 1.

Based on the preceding solution, the first sending unit includes a calculation module and a sending module.

The calculation module is configured to determine a current target received power of the uplink data with the following formula:

$$ReceivedTargetPower = InitialReceivedTargetPower + (TRANSMISSION\_COUNTER-1)*powerRampingStep;$$

where ReceivedTargetPower is the current target received power, InitialReceiveTargetPower is an initial target received power of the uplink data in a first transmission, TRANSMISSION_COUNTER is a serial number of a current transmission of the uplink data, and powerRampingStep is an incremental step of received power.

The sending module is configured to send, according to the current target received power, the uplink data.

Based on the preceding solution, the apparatus further includes a first receiving unit.

The first receiving unit is configured to receive a system message, a radio resource control (RRC) signaling or a dedicated message.

The system message, the RRC signaling or the dedicated message carries at least one of the initial target received power or the incremental step of received power.

The RRC signaling includes an RRC connection reconfiguration signaling, an RRC connection release signaling, an RRC connection setup signaling or an RRC connection reestablishment signaling.

Based on the preceding solution, the second sending unit is configured to: in a case that a transmission condition of sending the uplink data by using the unlicensed resource satisfies a preset condition, send the uplink data by using the licensed resource.

Based on the preceding solution, the second sending unit is configured to: if a random access response sent by a base station and carrying uplink grant information is received after the uplink data is sent by using the unlicensed resource, send the uplink data by using the licensed resource indicated by the uplink grant information.

Based on the preceding solution, the second sending unit is configured to: if a number of transmissions of the uplink data with the unlicensed resource reaches a preset number, re-initiate a random access and send the uplink data by using the licensed resource.

Based on the preceding solution, the apparatus further includes a second receiving unit.

The second receiving unit is configured to receive a system message, an RRC signaling or a dedicated message sent by the base station, where the system message or the RRC signaling carries the preset numbers; and the RRC signaling includes an RRC connection reconfiguration signaling, an RRC connection release signaling, an RRC connection setup signaling or an RRC connection reestablishment signaling.

Based on the preceding solution, the second sending unit is configured to: if a previous transmission of the uplink data using the unlicensed resource fails and has a transmit power reaching a power threshold, re-initiate the random access and send the uplink data using the licensed resource.

In a fifth aspect, an embodiment of the present disclosure provides an uplink data transmission apparatus disposed in a terminal. The apparatus includes a first random access unit and a third sending unit.

The first random access unit is configured to send a preamble sequence by using an unlicensed resource.

The third sending unit is configured to send uplink data within a transmission time interval corresponding to a moment at which the preamble sequence is sent.

The first random access unit is further configured to: in a case that a random access response carrying uplink grant information is received within a preset period of time, re-send the uplink data by using a licensed resource indicated by the uplink grant information.

Based on the preceding solution, the first random access unit is further configured to: in a case that the random access response or a downlink notification sent by a base station is not received within the preset period of time, re-initiate a random access by using the unlicensed resource or the licensed resource, where the downlink notification is information sent by the base station in successful reception of the preamble sequence and the uplink data.

In a sixth aspect, an embodiment of the present disclosure provides an uplink data transmission apparatus disposed in a base station. The apparatus includes a detection unit, a fourth sending unit and a third receiving unit.

The detection unit is configured to detect a preamble sequence sent by a terminal by using an unlicensed spectrum and detect uplink data sent by the terminal, where the uplink data is sent by the terminal within a transmission time interval corresponding to a moment at which the preamble sequence is sent.

The fourth sending unit is configured to: in a case that the preamble sequence is correctly decoded and the uplink data is not correctly decoded, send a random access response carrying uplink grant information to the terminal by using a licensed resource within a preset period of time, where the uplink grant information is used for indicating the licensed resource scheduled to the terminal.

The third receiving unit is configured to receive, on the licensed resource indicated by the uplink grant information, the uplink data sent by the terminal.

In a seventh aspect, an embodiment of the present disclosure provides an uplink data transmission apparatus including a memory and a processor.

The memory is configured to store executable programs.

The processor is configured to execute the executable programs stored in the memory to perform steps described below:

sending uplink data by using an unlicensed resource; and sending the uplink data by using a licensed resource in a case that the sending the uplink data by using the unlicensed resource fails.

In an eighth aspect, an embodiment of the present disclosure provides an uplink data transmission apparatus including a memory and a processor.

The memory is configured to store executable programs.

The processor is configured to execute the executable programs stored in the memory to perform steps described below:

sending a preamble sequence by using an unlicensed resource;

sending uplink data within a transmission time interval corresponding to a moment at which the preamble sequence is sent; and in a case that a random access response carrying uplink grant information is received within a preset period of time, re-sending the uplink data by using a licensed resource indicated by the uplink grant information.

In a ninth aspect, an embodiment of the present disclosure provides an uplink data transmission apparatus including a memory and a processor.

The memory is configured to store executable programs.

The processor is configured to execute the executable programs stored in the memory to perform steps described below:

detecting a preamble sequence sent by a terminal by using an unlicensed spectrum;

detecting uplink data sent by the terminal, where the uplink data is sent by the terminal within a transmission time interval corresponding to a moment at which the preamble sequence is sent;

in a case that the preamble sequence is correctly decoded and the uplink data is not correctly decoded, sending a random access response carrying uplink grant information to the terminal by using a licensed resource within a preset period of time, where the uplink grant information is used for indicating the licensed resource scheduled to the terminal; and receiving, on the licensed resource indicated by the uplink grant information, the uplink data sent by the terminal.

In a tenth aspect, an embodiment of the present disclosure further provides a storage medium configured to store executable programs which, when being executed by a processor, implement steps described below:

sending uplink data by using an unlicensed resource; and sending the uplink data by using a licensed resource in a case that the sending the uplink data by using the unlicensed resource fails.

In an eleventh aspect, an embodiment of the present disclosure further provides a storage medium configured to store executable programs which, when being executed by a processor, implement steps described below:

sending a preamble sequence by using an unlicensed resource;

sending uplink data within a transmission time interval corresponding to a moment at which the preamble sequence is sent; and in a case that a random access response carrying uplink grant information is received within a preset period of time, re-sending the uplink data by using a licensed resource indicated by the uplink grant information.

In a twelfth aspect, an embodiment of the present disclosure further provides a storage medium configured to store executable programs which, when being executed by a processor, implement steps described below:

detecting a preamble sequence sent by a terminal by using an unlicensed spectrum;

detecting uplink data sent by the terminal, where the uplink data is sent by the terminal within a transmission time interval corresponding to a moment at which the preamble sequence is sent;

in a case that the preamble sequence is correctly decoded and the uplink data is not correctly decoded, sending a random access response carrying uplink grant information to the terminal by using a licensed resource within a preset period of time, where the uplink grant information is used for indicating the licensed resource scheduled to the terminal; and receiving, on the licensed resource indicated by the uplink grant information, the uplink data sent by the terminal.

In the uplink data transmission method and apparatus and the storage medium provided in the embodiments of the present disclosure, in the case that sending the uplink data by using the unlicensed resource fails, the uplink data is automatically sent using the licensed resource. Apparently, with respect to the problem of a high transmission failure rate due to repeated transmissions with the unlicensed resource, a reception success rate of the uplink data is improved.

In the uplink data transmission method and apparatus and the storage medium provided in the embodiments of the present disclosure, in a case that the base station successfully receives the preamble sequence sent by using the unlicensed resource and fails to receive the uplink data, the base station sends the random access response carrying the uplink grant information to the terminal. After receiving the random access response, the terminal sends the uplink data using the licensed resource to reduce failed transmissions when an uplink data is repeatedly sent using the unlicensed resource, thereby improving a transmission success rate of the uplink data.

DETAILED DESCRIPTION

Technical solutions of the present disclosure will be further described in detail with reference to the drawings and in conjunction with specific embodiments.

Figure 4:
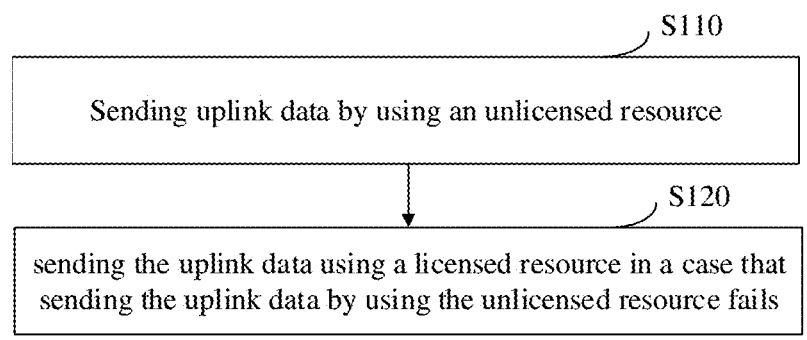
FIG. 4 is a flowchart of a first uplink data transmission method according to an embodiment of the present disclosure.

As shown in FIG. 4, an uplink data transmission method is provided according to an embodiment. The method is applied to a terminal and includes steps described below.

Step S110 includes: sending uplink data by using an unlicensed resource.

Step S120 includes: in a case that the sending the uplink data by using the unlicensed resource fails, sending the uplink data by using a licensed resource.

In the embodiment, the terminal is also referred to as a UE. The UE here may be a human-portable terminal such as a mobile phone, a tablet computer or a wearable device, a vehicle-mounted UE and various terminal devices in an Internet of Things.

In step S110, the unlicensed resource is used for sending the uplink data. The unlicensed resource here is a transmission resource selected within an unlicensed resource pool. The transmission resource may include at least one of a transmission spectrum or a transmission timeslot or the like. Generally, sending the uplink data in step S110 may include directly selecting the unlicensed resource to send the uplink data, and may further include sending a preamble sequence using the unlicensed resource and sending the uplink data at least once within a transmission time interval corresponding to a moment at which the sending the preamble sequence is accomplished.

In step S120, after the preamble sequence is sent, the uplink data may be sent once or multiple times. In the embodiment, to ensure that the uplink data is successfully sent, in a case that the sending the uplink data by using the unlicensed resource fails multiple times, the terminal will automatically re-sends the uplink data by using the licensed resource. It is transparent for a user that the terminal sends the uplink data by using the licensed resource, which is equivalent to a successful transmission for the user and apparently reduces a reminder probability of uplink data transmission failure; the terminal automatically sends the uplink data by using the licensed resource, improving a transmission success rate with respect to a case that the terminal re-selects an unlicensed resource to send the uplink data.

Specifically, step S120 may include: sending the uplink data by using the unlicensed resource in a manner of incremental target received power, where a target received power of the uplink data in an (n+1)-th transmission is greater than a target received power of the uplink data in an n-th transmission, where n is a positive integer greater than or equal to 1. For example, the uplink data is sent multiple times, e.g., N times, by using the unlicensed resource in the manner of incremental target received power, where n is a positive integer less than N, and N is a positive integer greater than or equal to 2. A value of N is at least 2 and may specifically be 3, 4, 5 or the like. Here, the value of N may be negotiated in advance between the terminal and a base station or may be predefined in the terminal. Of course, N may be randomly generated or may be dynamically determined according to a current wireless environment.

Here, dynamically determining N according to the wireless environment may include: dynamically sensing usage of the unlicensed resource to obtain a sensing result; and determining N according to the sensing result. For example, if the sensing result indicates that S transmission timeslots or S transmission subframes before a current moment are occupied totally or occupied by a preset proportion, N is a first preset value. If the S transmission timeslots or S transmission subframes are not occupied, N is a second preset value. The first preset value is not equal to the second preset value. It is only a simple example here, and many specific implementation manners exist. In short, N may be determined according to the sensing result.

In the embodiment, the uplink data may be sent multiple times in the manner of incremental target received power. Here, the manner of incremental target received power refers to a method for sending uplink data in which a transmit power is adjusted for a purpose of increasing an uplink data received power at the base station. For example, the terminal determines the target received power in a manner of incremental received power in a previous and a current transmissions, obtains the transmit power in the current transmission according to a correspondence or a calculation function between the target received power and the transmit power, and sends the uplink data with the obtained transmit power in the current transmission. A path loss power in the current transmission is involved in a process of determining the transmit power in the current transmission according to the target received power. The path loss power here may be measured through channel estimation or may be a pre-given path loss value. The transmit power in the current transmission may be a sum of the target received power and the path loss value. Of course, in a specific implementation, a correction factor may be introduced. The correction factor is used for further correcting the transmit power based on the sum of the target received power and the path loss value, thereby obtaining more accurate transmit power and ensuring that the target received power of the base station is increased time by time.

In this way, the target received power of the uplink data in the current transmission is higher than the target received power of the uplink data in the previous transmission. Since the transmit power is increased, the base station (eNB) successfully receives the uplink data at a higher probability, thereby increasing the transmission success rate of the uplink data. Moreover, since a relatively low target received power is used at the beginning, interference with communications of other terminals or base stations due to high target received power may be reduced and overall wireless interference may be reduced.

In an embodiment, the method further includes: acquiring a maximum target received power; sending the uplink data according to the maximum target received power in the current transmission if it is determined that a current target received power is greater than the maximum target received power; and stopping the current transmission of the uplink data if the target received power in the previous transmission has been already equal to the maximum target received power, and re-sending the preamble sequence by using the unlicensed resource or the licensed resource to perform the random access again.

In some embodiments, a power transmitter of the terminal has its maximum transmit power. If the current transmit power determined according to the current target transmit power is greater than the maximum transmit power of the power transmitter, the uplink data is sent with the maximum transmit power. If the current transmission fails again, a next transmission of the uplink data is stopped and the random access is performed again, or the uplink data is re-sent by using the licensed resource.

Generally, if the base station successfully receives the uplink data and decodes the uplink data, the base station sends a downlink notification to the terminal. If the terminal fails to receive the downlink notification, the terminal may repeatedly send the uplink data multiple times and stop or suspend transmitting the uplink data by using the unlicensed resource when a preset condition is satisfied.

Apparently, the uplink data may be sent in a manner of incremental power. In this manner, on one hand, in a case that sending the uplink data according to a relatively low target power fails, the transmission success rate of the uplink data may be improved by increasing the target received power; on the other hand, the uplink data is not sent according to the maximum target received power at the beginning, which may reduce mutual interference of wireless signals. Apparently, in the manner of incremental power, the uplink data may be sent by using the unlicensed resource at a higher success rate.

Figure 5:
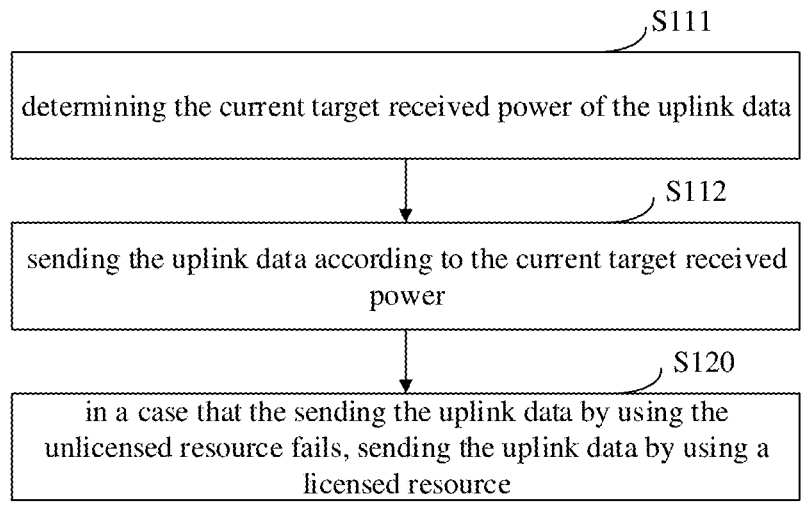
FIG. 5 is a flowchart of a second uplink data transmission method according to an embodiment of the present disclosure.

Specifically, as shown in FIG. 5, step S110 may include steps S111 and S112 described below.

Step S111 includes: determining the current target received power of the uplink data with the following formula:

ReceivedTargetPower=InitialReceivedTargetPower+
(TRANSMISSION_COUNTER−1)*power-
RampingStep;

where ReceivedTargetPower is the current target received power, InitialReceiveTargetPower is an initial target received power of the uplink data in a first transmission, TRANSMISSION_COUNTER is a serial number of a current transmission of the uplink data, and powerRampingStep is an incremental step of received power.

Step S112 includes: sending the uplink data according to the current target received power.

In the embodiment, the initial target received power is determined. The initial target received power and the incremental step of received power may be pre-stored in the terminal or may be received by the terminal from the base station. For example, the initial target received power is delivered by the base station via an RRC signaling, a system message or a dedicated message, or the transmit power is pre-negotiated between the base station and the terminal. The system message, the RRC signaling or a dedicated message carries at least one of the initial target received power or the incremental step of received power. The RRC signaling includes an RRC connection reconfiguration signaling, an RRC connection release signaling, an RRC connection setup signaling or an RRC connection reestablishment signaling.

In some embodiments, a maximum number of transmissions, i.e., a maximum value of TRANSMISSION_COUNTER, may also be negotiated between the terminal and the base station. In this way, the base station may control the maximum target received power of the uplink data sent by the terminal using the unlicensed resource, thereby avoiding wireless interference due to excessive power. Of course, the terminal and the base station may directly pre-define or negotiate the maximum target received power so as to limit the transmit power. The TRANSMISSION_COUNTER here may also be received through the system message, the RRC signaling or the dedicated message.

Step S112 may include:

calculating the current transmit power according to a correspondence or a conversion function between the current target received power and the current transmit power, and sending the uplink data with the current transmit power.

In some embodiments, step S120 may include sending the uplink data by using the licensed resource in a case that a transmission condition of the uplink data satisfies a preset condition.

Figure 1:
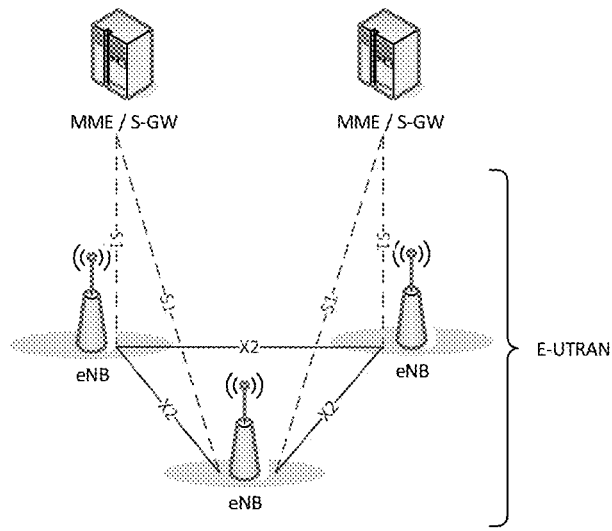
FIG. 1 is a structural diagram of a wireless communication system.
Figure 2:
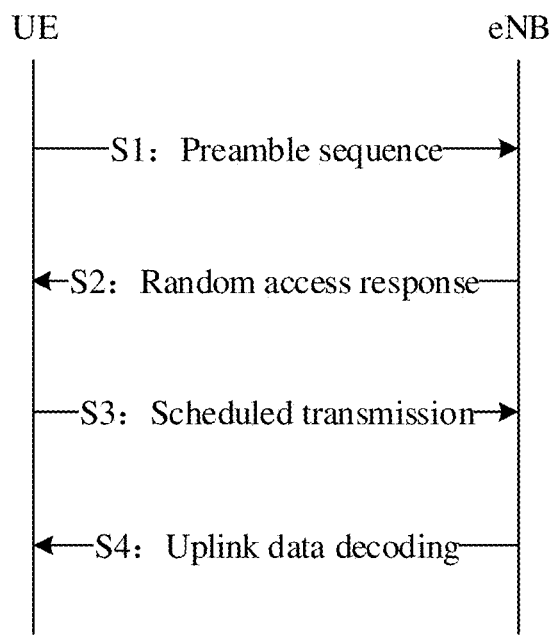
FIG. 2 is a flowchart of a random access.
Figure 3:
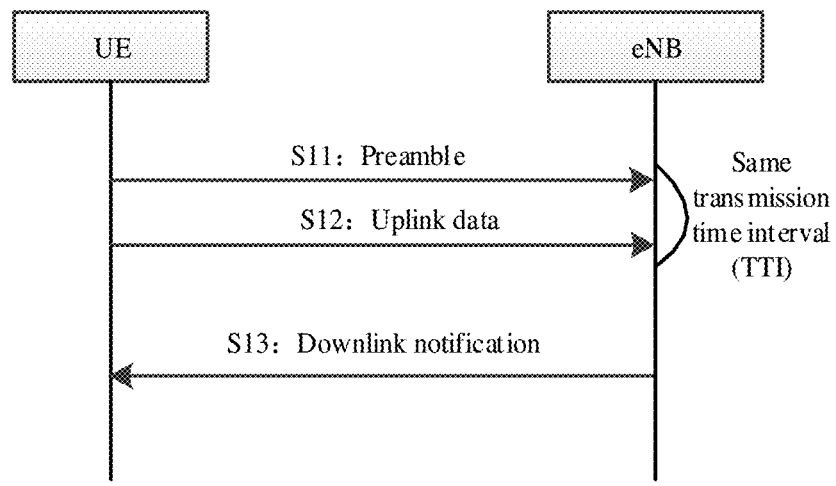
FIG. 3 is a flowchart of another random access.

To ensure a successful transmission of the uplink data, the terminal monitors the transmission condition of the uplink data. For example, when the base station receives the uplink data, the base station sends the downlink notification. If failing to receive the downlink notification, the terminal may determine that the data has not been successfully sent or successfully decoded by the base station, and it is necessary to continue to send the uplink data. Of course, the terminal may also monitor the number of transmissions of the uplink data. Of course, the terminal may also determine, according to a current moment, whether the current moment and a transmission moment at which the preamble sequence is sent belong to a same transmission time interval; and in a case that the uplink data is not successfully sent, the terminal may determine whether continue to send the uplink data by using the unlicensed resource or perform a next random access. The random access here may be a random access with a licensed resource as shown in FIG. 2 or a random access with an unlicensed resource as shown in FIG. 3.

The preset condition have various implementations. Several optional implementations are provided below.

Optional Implementation 1

Step S120 may include: after the uplink data is sent by using the unlicensed resource, if an uplink notification or a random access response returned by the base station is not received within a preset period of time, initiating a random access with a licensed resource, and re-sending the uplink data by using the licensed resource obtained through the random access.

For example, when both sending an m-th preamble sequence and sending the uplink data corresponding to the m-th preamble sequence fail, an (m+1)-th random access is performed by using the licensed resource and the uplink data is sent by using the licensed resource obtained through the random access, where m is a positive integer greater than or equal to 1. In an embodiment, if both sending the m-th preamble sequence and sending the uplink data corresponding to the m-th preamble sequence fail, the terminal cannot receive any feedback from the base station on the preamble sequence or the uplink data within a specified time range and may determine that both sending the preamble sequence and sending the uplink data fail. In this case, the terminal may perform the next random access by using the licensed resource. In the embodiment, the random access may be preferably performed by using the licensed resource to reduce a retransmission failure of the uplink data with the unlicensed resource.

Optional Implementation 2

Step S120 may include: if the random access response sent by the base station and carrying uplink grant information is received after the uplink data is sent by using the unlicensed resource, sending the uplink data by using a licensed resource indicated by the uplink grant information.

In a case that sending the uplink data fails one or more times within a transmission time interval corresponding to an m-th preamble sequence, the random access response returned by the base station by using the licensed resource is received and the random access is performed by using the random access response.

If the base station receives the preamble sequence sent by the terminal but fails to receive the uplink data corresponding to the preamble sequence, the base station may send a random response to the terminal, and the terminal may receive the random access response. Here, the random access response is sent by the base station by using the licensed resource and carries the uplink grant information. The uplink grant information here may be indication information indicating the licensed resource scheduled by the base station to the terminal so that the terminal may perform the random access and the uplink data transmission using the licensed resource indicated by the uplink grant information, i.e., using an uplink resource.

Optional Implementation 3

Step S120 may include: if the number of transmissions of the uplink data using the unlicensed resource reaches a preset number, re-initiating the random access and sending the uplink data on the licensed resource. In the embodiment, it is equivalent that a maximum number of transmissions of the uplink data using the unlicensed spectrum corresponding to one preamble sequence transmission is set to avoid power consumption due to an excess of transmission failures of the terminal, reduce the power consumption of the terminal, and extend standby duration of a mobile terminal.

To further improve the embodiment, the method further includes:

receiving a system message, an RRC signaling or a dedicated message sent by the base station, where the system message or the RRC signaling carries the preset number; and the RRC signaling includes an RRC connection reconfiguration signaling, an RRC connection release signaling, an RRC connection setup signaling or an RRC connection reestablishment signaling. The system message here may be a broadcast message, a multicast message or a unicast message. The RRC signaling or the dedicated signaling may also be sent in a broadcast, multicast or unicast manner.

Optional Implementation 4

Step S120 may include: in a case that a previous transmission of the uplink data using the unlicensed resource fails and has a transmit power reaching a power threshold, perform the random access again by using the licensed resource and sending the uplink data on the licensed resource. In the embodiment, if the target received power of the uplink data has reached the power threshold, it indicates that the target received power of the uplink data in the previous failed transmission is the maximum target received power allowed. In this case, the target received power of the uplink data cannot be further increased in the manner of incremental target received power. To reduce inefficient transmissions, in the embodiment, a next random access may be performed by using the licensed resource or the unlicensed resource.

Figure 6:
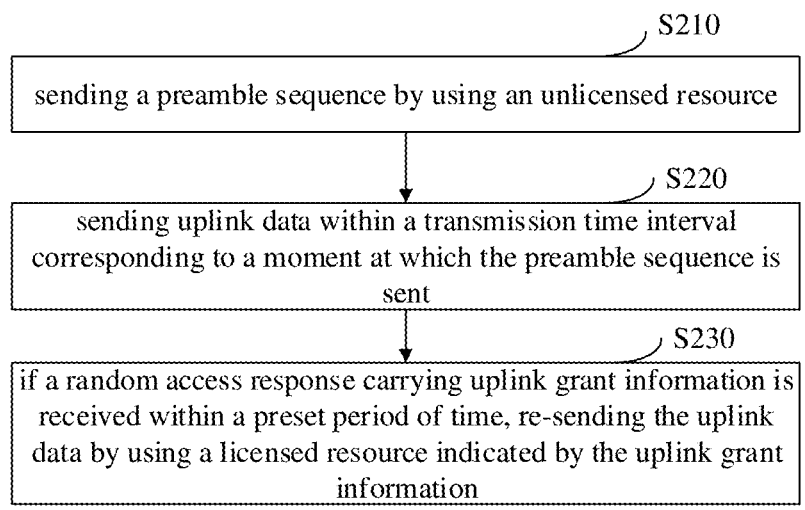
FIG. 6 is a flowchart of a third uplink data transmission method according to an embodiment of the present disclosure.

As shown in FIG. 6, an uplink data transmission method is provided according to an embodiment. The method is applied to a terminal and includes steps described below.

Step S210 includes sending a preamble sequence by using an unlicensed resource.

Step S220 includes sending uplink data within a transmission time interval corresponding to a moment at which the preamble sequence is sent.

Step S230 includes: in a case that a random access response carrying uplink grant information is received within a preset period of time, re-sending the uplink data by using a licensed resource indicated by the uplink grant information.

The uplink data transmission method provided by the embodiment is still a method applied to a UE.

Step S210 may include sending the preamble sequence by using the unlicensed resource first. The uplink data is sent after the preamble sequence is sent. Generally, the uplink data is sent within the transmission time interval corresponding to the moment at which the preamble sequence is sent. Therefore, in step S220, the uplink data is sent within a same transmission interval where the preamble sequence is sent.

If the preamble sequence is successfully sent while sending the uplink data fails or a base station fails in decoding the uplink data, the base station may send the random access response. The random access response carries the uplink grant information. The uplink grant information may be used for identifying identification information for scheduling the licensed resource of the terminal.

In this way, the terminal does not need to re-send the preamble sequence, reducing a number of transmissions of the preamble sequence and reducing power consumption required for sending the preamble sequence.

To ensure a successful transmission of the uplink data, in step S230, the terminal may re-send the uplink data by using the indicated licensed resource to ensure that the base station successfully receives the uplink data.

Furthermore, the method further includes step S240: in a case that the random access response or a downlink notification sent by the base station is not received within the preset period of time, re-initiating a random access by using the unlicensed resource or the licensed resource, where the downlink notification is information sent by the base station in successful reception of the preamble sequence and the uplink data.

In the embodiment, the terminal still sends the preamble sequence by using the unlicensed resource, and in step S230, the uplink data is still sent. After sending the preamble sequence and/or the uplink data, the terminal starts timing and receives, within the preset period of time corresponding to the timing, information sent by the base station, where the information sent by the base station includes the random access response or the downlink notification directed to the preamble sequence.

In the embodiment, if the terminal fails to receive the downlink notification or the random access response within the preset period of time, the terminal re-initiates the random access by using the unlicensed resource or the licensed resource. In the embodiment, the random access is preferably performed by using the licensed resource.

Figure 7:
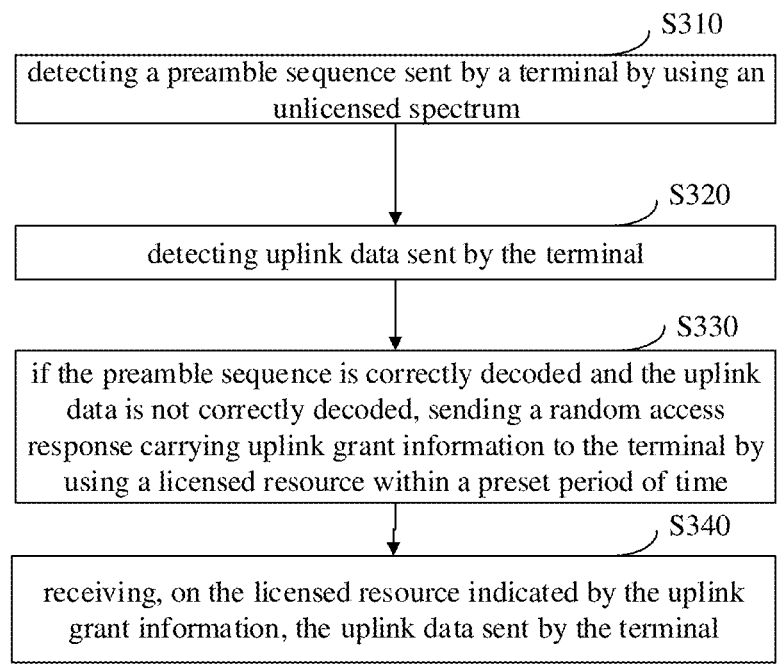
FIG. 7 is a flowchart of a fourth uplink data transmission method according to an embodiment of the present disclosure.

As shown in FIG. 7, an uplink data transmission method is provided according to an embodiment. The method is applied to a base station and includes steps described below.

Step S310 includes detecting a preamble sequence sent by a terminal by using an unlicensed spectrum.

Step S320 includes detecting uplink data sent by the terminal. The uplink data is sent by the terminal within a transmission time interval corresponding to a moment at which the preamble sequence is sent.

Step S330 includes: in a case that the preamble sequence is correctly decoded and the uplink data is not correctly decoded, sending a random access response carrying uplink grant information to the terminal by using a licensed resource within a preset period of time. The uplink grant information is used for indicating the licensed resource scheduled to the terminal.

Step S340 includes receiving, on the licensed resource indicated by the uplink grant information, the uplink data sent by the terminal.

The embodiment is applied to the base station. The base station detects the preamble sequence for the random access and/or the uplink data on the unlicensed resource. If the base station detects the preamble sequence sent by using the unlicensed resource, but fails in receiving the uplink data of the terminal on the unlicensed resource or fails in decoding the uplink data sent by the terminal by using the unlicensed resource, the base station sends the random access response to the terminal. The random access response here is sent by using the licensed resource and carries the uplink grant information that informs the terminal of the licensed resource scheduled to the terminal for re-sending the uplink data, In this way, the terminal sends the uplink data by using the licensed resource, improving a transmission success rate of the uplink data.

Figure 8:
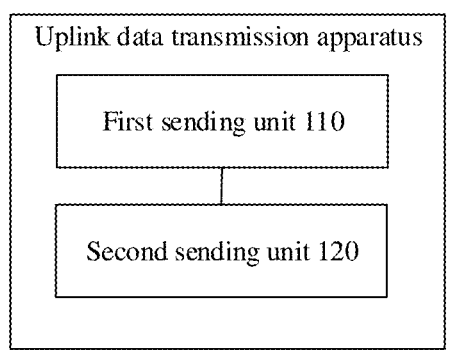
FIG. 8 is a structural diagram of a first uplink data transmission apparatus according to an embodiment of the present disclosure.

As shown in FIG. 8, an uplink data transmission apparatus is provided according to an embodiment. The apparatus is disposed in a terminal and includes a first sending unit 110 and a second sending unit 120.

The first sending unit 110 is configured to send uplink data by using an unlicensed resource.

The second sending unit 120 is configured to send the uplink data by using a licensed resource in a case that sending the uplink data by using the unlicensed resource fails.

The apparatus provided by the embodiment is applied to various terminals. The first sending unit 110 may correspond to a wireless communication interface and a processor or a processing circuit. The processor may be configured to select the unlicensed resource for sending the uplink data from an unlicensed resource pool. The wireless communication interface is connected to the processor and configured to send a preamble sequence on the unlicensed resource.

In the embodiment, the second sending unit 120 also corresponds to a wireless communication interface. The wireless communication interface here may be a transmit antenna. In the embodiment, the transmit antenna is further configured to send the uplink data which is also sent by using the unlicensed resource.

Optionally, the first sending unit 110 is configured to send the uplink data by using the unlicensed resource in a manner of incremental target received power. A target received power of the uplink data in an (n+1)-th transmission is greater than a target received power of the uplink data in an n-th transmission, where n is a positive integer greater than or equal to 1.

The apparatus provided by the embodiment is applied to various terminals. The first sending unit 110 may correspond to the processor and the wireless communication interface. The processor may be configured to select the unlicensed resource for sending the preamble sequence from the unlicensed resource pool and select the corresponding preamble sequence. The wireless communication interface is connected to the processor and configured to send the preamble sequence on the unlicensed resource.

In some embodiments, the first sending unit 120 includes a calculation module and a sending module.

The calculation module may correspond to various calculators or processors or circuits having a calculation function, and may be configured to determine a current target received power of the uplink data with the following formula:

ReceivedTargetPower=InitialReceivedTargetPower+
(TRANSMISSION_COUNTER−1)*power-
RampingStep;

where ReceivedTargetPower is the current target received power, InitialReceiveTargetPower is an initial target received power of the uplink data in a first transmission, TRANSMISSION_COUNTER is a serial number of a current transmission of the uplink data, and powerRampingStep is an incremental step of received power.

The sending module corresponds to a transmission interface such as the transmit antenna and may be configured to send, according to the current target received power, the uplink data.

In the embodiment, the current target received power is calculated in a manner of incremental power. A current received power here is the target received power of the uplink data in a current transmission. A transmit power is calculated using a current target transmit power and the uplink data is sent by using the calculated transmit power. A probability at which a base station successfully receives the uplink data may be improved by increasing the target received power.

The preceding formula is an approach for determining the transmit power in the current transmission. In a specific implementation, a target transmit power table may be provided, and multiple different target transmit power values are stored in the target transmit power table. In determining the target transmit power, the target transmit power table may be queried according to a current number of transmissions to obtain the target transmit power in the current transmission, and then the uplink data may be sent by using the target transmit power obtained by querying the table.

In some embodiments, the apparatus further includes a first receiving unit.

The first receiving unit is configured to receive a system message, a radio resource control (RRC) signaling or a dedicated message.

The system message, the RRC signaling or the dedicated message carries at least one of the initial target received power or the incremental step of received power.

The RRC signaling includes an RRC connection reconfiguration signaling, an RRC connection release signaling, an RRC connection setup signaling or an RRC connection reestablishment signaling.

The first receiving unit here may correspond to a receiving interface such as a receive antenna in the terminal, and may receive from the base station at least one of the initial target received power and the incremental step of received power carried in various messages.

The second sending unit 120 is configured to send the uplink data by using the licensed resource in a case that a transmission condition of sending the uplink data by using the unlicensed resource satisfies a preset condition.

In the embodiment, if the transmission condition of the uplink data satisfies a preset condition, the random access may need to be performed again, and the licensed resource is obtained through the random access to send the uplink data. Alternatively, the uplink data is sent by using the licensed resource acquired through sending the preamble sequence by using the unlicensed resource before the current transmission of the uplink data. Multiple specific implementations are included and separately described below.

In a first implementation, the second sending unit 120 is configured to: if a random access response sent by the base station and carrying uplink grant information is received after the uplink data is sent by using the unlicensed resource, send the uplink data by using the licensed resource indicated by the uplink grant information.

In a second implementation, the second sending unit 120 is configured to: if a number of transmissions of the uplink data using the unlicensed resource reaches a preset number, re-initiate the random access and send the uplink data on the licensed resource.

Furthermore, the apparatus further includes a second receiving unit.

The second receiving unit is configured to receive a system message, an RRC signaling or a dedicated message sent by the base station. The system message or the RRC signaling carries the preset number; and the RRC signaling includes an RRC connection reconfiguration signaling, an RRC connection release signaling, an RRC connection setup signaling or an RRC connection reestablishment signaling.

The second receiving unit here may also correspond to the receive antenna in the terminal and acquire the preset number and the like carried in the received system message, RRC signaling or dedicated message. These messages may be sent in a broadcast, multicast or unicast manner. In a third implementation, the second sending unit 120 is configured to: in a case that a previous transmission of the uplink data using the unlicensed resource fails and has a transmit power reaching a power threshold, re-initiate the random access and send the uplink data by using the licensed resource.

Figure 9:
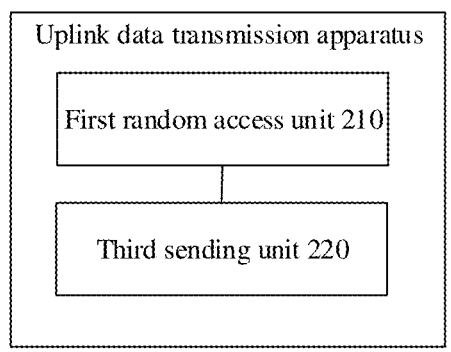
FIG. 9 is a structural diagram of a second uplink data transmission apparatus according to an embodiment of the present disclosure.

As shown in FIG. 9, an uplink data transmission apparatus is provided according to an embodiment. The apparatus is disposed in a terminal and includes a first random access unit 210 and a third sending unit 220.

The first random access unit 210 is configured to send a preamble sequence by using an unlicensed resource.

The third sending unit 220 is configured to send uplink data within a transmission time interval corresponding to a moment at which the preamble sequence is sent.

The first random access unit 210 is further configured to: in a case that a random access response carrying uplink grant information is received within a preset period of time, re-send the uplink data by using a licensed resource indicated by the uplink grant information.

A hardware structure of the first random access unit 210 in the embodiment is similar to a structure of the first sending unit 110 mentioned in the preceding embodiment. The first random access unit 210 may also correspond to a processor and a wireless communication interface, and may also be configured to select the unlicensed resource and send the selected preamble sequence by using the selected unlicensed resource.

A hardware structure of the third sending unit 220 is similar to a hardware structure of the second sending unit 120, and may also correspond to a wireless communication interface to send the uplink data.

The first random access unit 210 is further configured to: in a case that the random access response is received within the preset period of time, re-send the uplink data by using the licensed resource scheduled by a base station to ensure a transmission success rate of the uplink data.

Optionally, the first random access unit 210 is further configured to: in a case that the random access response or a downlink notification sent by the base station is not received within the preset period of time, re-initiate a random access by using the unlicensed resource or the licensed resource. The downlink notification is information sent by the base station in successful reception of the preamble sequence and the uplink data.

In the embodiment, if neither the random access response nor the downlink notification is received within the preset period of time, the random access is re-initiated. The re-initiated random access here may be a random access performed using the licensed resource or a random access initiated using the unlicensed resource.

In an embodiment of the present disclosure, the licensed resource for sending the preamble sequence is a licensed random access resource.

Figure 10:
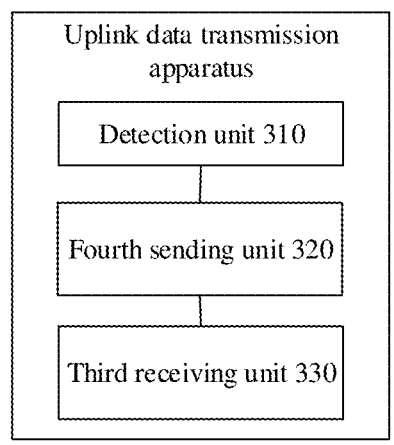
FIG. 10 is a structural diagram of a third uplink data transmission apparatus according to an embodiment of the present disclosure.

As shown in FIG. 10, an uplink data transmission apparatus is provided according to an embodiment. The apparatus is disposed in a base station and includes a detection unit 310, a fourth sending unit 320 and a third receiving unit 330.

The detection unit 310 is configured to detect a preamble sequence sent by a terminal by using an unlicensed spectrum and detect uplink data sent by the terminal. The uplink data is sent by the terminal within a transmission time interval corresponding to a moment at which the preamble sequence is sent.

The fourth sending unit 320 is configured to: in a case that the preamble sequence is correctly decoded and the uplink data is not correctly decoded, send a random access response carrying uplink grant information to the terminal by using a licensed resource within a preset period of time. The uplink grant information is used for indicating the licensed resource scheduled to the terminal.

The third receiving unit 330 is configured to receive, on the licensed resource indicated by the uplink grant information, the uplink data sent by the terminal.

The uplink data transmission apparatus in the embodiment is applied to the base station. The base station here may be an evolved NodeB (eNB) or a next-generation NodeB (gNB).

The detection unit 310 may correspond to a wireless communication interface and a decoder. The wireless communication interface is configured to receive a wireless signal. The decoder is configured to decode the received wireless signal to obtain the preamble sequence and/or the uplink data sent by the terminal.

The fourth sending unit 320 may correspond to an air interface of the base station and be configured to send the random access response to the terminal.

The third receiving unit 330 may correspond to an air interface of the base station and be configured to receive the uplink data sent by using the licensed resource.

Several specific examples are provided below in conjunction with any embodiment described above.

EXAMPLE 1

When a UE sends uplink data by using an unlicensed resource, a power control approach based on incremental power is adopted The first time the UE sends the uplink data by using the unlicensed resource, the UE sends the uplink data according to an initial target received power (corresponding to the initial target received power). If a first transmission fails, the UE needs to send the uplink data by using the unlicensed resource again at a higher transmit power. The rest can be done in the same manner. The transmit power is increased every time a transmission failure occurs.

For example, if the initial target received power is InitialReceivedTargetPower and a received power compensation PowerRampingStep is added every time, so at a TRANSMISSION_COUNTER-th time of sending the uplink data by using the unlicensed resource, the target received power is ReceivedTargetPower=InitialReceivedTargetPower+(TRANSMISSION_COUNTER−1)*powerRampingStep.

The initial target received power and incremental power may be broadcast through system information or may be configured via RRC signaling. The RRC signaling includes an RRCConnectionReconfiguration signaling, an RRCConnectionRelease signaling, an RRCConnectionSetup signaling, an RRCConnectionReestablishment signaling, a newly defined message or the like.

EXAMPLE 2

If a UE sends uplink data by using an unlicensed resource with insufficient transmit power, a base station cannot monitor unlicensed uplink data. In this case, the base station may successfully detects a preamble sequence and cannot detect the uplink data. However, the base station may return a random access response for the preamble sequence so that an unlicensed uplink transmission process may be converted to a traditional random access process.

Figure 11:
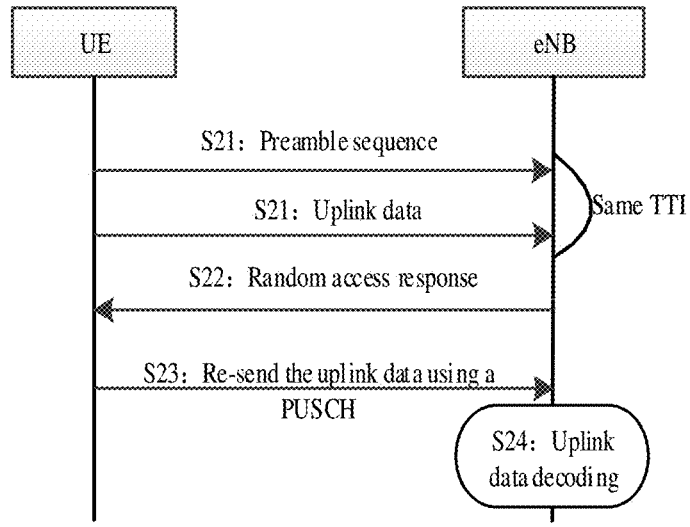
FIG. 11 is a structural diagram of a fourth uplink data transmission apparatus according to an embodiment of the present disclosure.

When failing to send the unlicensed uplink data, the UE initiates the traditional random access process. As shown in FIG. 11, the random access process includes steps described below.

In step S21, the UE sends the preamble sequence, and selects a resource from unlicensed resources to send the uplink data.

In step S22, when an eNB parses the preamble sequence and fails to detect the unlicensed uplink data, the eNB returns the random access response carrying an uplink grant.

In step S23, the UE retransmits the uplink data on a licensed uplink resource and carries information such as an identifier of the UE.

In step S24, the eNB receives and parses the uplink data on the licensed uplink resource, confirms the UE, resolves a collision, and sends a contention resolution identifier to the UE. The licensed uplink resource here may be a PUSCH used for re-sending the uplink data as shown in FIG. 11.

The random access response can be received by multiple UEs that perform random accesses with the same preamble sequence. If the UE carries the identifier of the UE in step S23, when the base station receives the uplink data sent by the multiple UEs on the licensed resource in step S24, the base station may determine to decode the uplink data from which UE according to an extracted identifier of the UE, thereby confirming the UE and resolving the collision.

EXAMPLE 3

If a UE sends uplink data by using an unlicensed resource with insufficient transmit power, a base station cannot detect unlicensed uplink data. In this case, the base station may fail to detect a preamble sequence and cannot return a random access response. An unlicensed uplink transmission process may be converted to a traditional random access process.

In case of n failed transmissions of the unlicensed uplink data, the UE initiates the traditional random access process, where n is broadcast through system information or configured via RRC signaling.

Alternatively, in a case that the UE still fails to send the unlicensed uplink data with a maximum transmit power, the UE initiates the traditional random access process.

Figure 12:
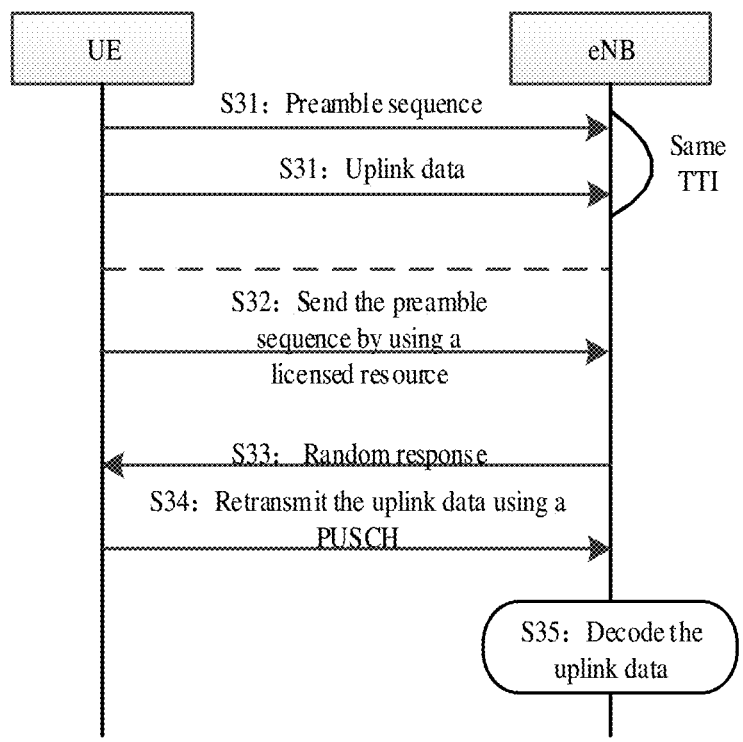
FIG. 12 is a structural diagram of a fifth uplink data transmission apparatus according to an embodiment of the present disclosure.

A flowchart is as shown in FIG. 12, and the random access process includes steps described below.

In step S31, the UE sends the preamble sequence and selects a resource from unlicensed resources to send the uplink data; an eNB fails to decode the preamble sequence and monitor the unlicensed uplink data and returns no response.

In step S32, the UE fails to wait for the random access response and then initiates the traditional random access process. The UE selects the preamble sequence again and sends the preamble sequence to the eNB.

In step S33, the eNB monitors the preamble sequence and returns a response message carrying information such as an uplink grant.

In step S34, the UE sends the uplink data on a licensed uplink resource and carries information such as an identifier of the UE. The licensed uplink resource here may be a PUSCH used for re-sending the uplink data as shown in FIG. 12.

In step S35, the eNB parses the uplink data on the licensed uplink resource, confirms the UE, resolves a collision, and sends a contention resolution identifier to the UE. Reference may be made to the preceding example for UE confirmation and collision resolution.

An embodiment of the present disclosure further provides an uplink data processing apparatus. The apparatus is disposed in a terminal and includes a memory and a processor.

The memory is configured to store executable programs.

The processor is configured to execute the executable programs stored in the memory to perform steps described below:

sending uplink data by using an unlicensed resource; and in a case that the sending the uplink data by using the unlicensed resource fails, sending the uplink data by using a licensed resource.

In the embodiment of the present disclosure, the processor is configured to execute computer programs to perform a step described below:

sending the uplink data by using the unlicensed resource in a manner of incremental target received power. A target received power of the uplink data in an (n+1)-th transmission is greater than a target received power of the uplink data in an n-th transmission, where n is a positive integer greater than or equal to 1.

In the embodiment of the present disclosure, the processor is configured to execute the computer programs to perform steps described below:

determining a current target received power of the uplink data with the following formula:

ReceivedTargetPower=InitialReceivedTargetPower+
(TRANSMISSION_COUNTER−1)*power-
RampingStep;

where ReceivedTargetPower is the current target received power, InitialReceiveTargetPower is an initial target received power of the uplink data in a first transmission, TRANSMISSION_COUNTER is a serial number of a current transmission of the uplink data, and powerRampingStep is an incremental step of received power; and sending the uplink data according to the current target received power.

In the embodiment of the present disclosure, the processor is configured to execute the computer programs to further perform a step described below:

receiving a system message, an RRC signaling or a dedicated message.

The system message, the RRC signaling or the dedicated message carries at least one of the initial target received power or the incremental step of received power.

The RRC signaling includes an RRC connection reconfiguration signaling, an RRC connection release signaling, an RRC connection setup signaling or an RRC connection reestablishment signaling.

In the embodiment of the present disclosure, the processor is configured to execute the computer programs to further perform:

if a random access response sent by a base station and carrying uplink grant information is received after the uplink data is sent by using the unlicensed resource, sending the uplink data by using the licensed resource indicated by the uplink grant information; or if a number of transmissions of the uplink data using the unlicensed resource reaches a preset number, re-initiating a random access and sending the uplink data is by using the licensed resource.

In the embodiment of the present disclosure, the processor is configured to execute the computer programs to further perform a step described below:

receiving a system message, an RRC signaling or a dedicated message sent by the base station. The system message or the RRC signaling carries the preset number; and the RRC signaling includes an RRC connection reconfiguration signaling, an RRC connection release signaling, an RRC connection setup signaling or an RRC connection reestablishment signaling.

In the embodiment of the present disclosure, the processor is configured to execute the computer programs to further perform a step described below:

in a case that a previous transmission of the uplink data using the unlicensed resource fails and has a transmit power reaching a power threshold, re-initiating the random access and sending the uplink data by using the licensed resource.

An embodiment of the present disclosure further provides an uplink data processing apparatus.

The apparatus is disposed in a terminal and includes a memory and a processor.

The memory is configured to store executable programs.

The processor is configured to execute the executable programs stored in the memory to perform steps described below:

sending a preamble sequence by using an unlicensed resource;

sending uplink data within a transmission time interval corresponding to a moment at which the preamble sequence is sent; and in a case that a random access response carrying uplink grant information is received within a preset period of time, re-sending the uplink data by using a licensed resource indicated by the uplink grant information.

In the embodiment of the present disclosure, the processor is configured to execute computer programs to further perform a step described below:

in a case that the random access response or a downlink notification sent by a base station is not received within the preset period of time, re-initiating a random access by using the unlicensed resource or the licensed resource, where the downlink notification is information sent by the base station in successful reception of the preamble sequence and the uplink data.

An embodiment of the present disclosure further provides an uplink data processing apparatus. The apparatus is disposed in a base station and includes a memory and a processor.

The memory is configured to store executable programs.

The processor is configured to execute the executable programs stored in the memory to perform steps described below:

detecting a preamble sequence sent by a terminal by using an unlicensed spectrum;

detecting uplink data sent by the terminal, where the uplink data is sent by the terminal within a transmission time interval corresponding to a moment at which the preamble sequence is sent;

in a case that the preamble sequence is correctly decoded and the uplink data is not correctly decoded, sending a random access response carrying uplink grant information to the terminal by using a licensed resource within a preset period of time. The uplink grant information is used for indicating the licensed resource scheduled to the terminal; and receiving the uplink data sent by the terminal on the licensed resource indicated by the uplink grant information.

It is understandable that the memory may be a volatile memory or a non-volatile memory, or may include both the volatile memory and the non-volatile memory. The non-volatile memory may be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disk or a compact disc read-only memory (CD-ROM). The magnetic surface memory may be a magnetic click memory or a magnetic tape memory. The volatile memory may be a random access memory (RAM), which serves as an external cache. By way of an illustrative description rather than a limited description, many forms of RAMs may be used, such as a static random access memory (SRAM), a synchronous static random access memory (SSRAM), a dynamic random access memory (DRAM), a synchronous dynamical random access memory (SDRAM), a double data rate synchronous dynamic random access memory (DDRSDRAM), an enhanced synchronous dynamic random access memory (ESDRAM), a synclink dynamic random access memory (SLDRAM), and a direct rambus random access memory (DRRAM). The memory 702 described in the embodiments of the present disclosure is intended to include, but is not limited to, these memories and any other suitable type of memory.

The memory in the embodiments of the present disclosure is used for storing various types of data to support the operations of the uplink data processing apparatus. Examples of the various types of data include any computer program, such as an operating system and an application program, operated on a data processing apparatus. The operating system includes various system programs, such as a framework layer, a core library layer, a drive layer and the like, for implementing various basic traffic and processing hardware-based tasks. The application program may include various application programs for implementing various application traffic. Programs for implementing the methods in the embodiments of the present disclosure may be included in the application program.

The methods disclosed by the embodiments of the present disclosure may be applied to the processor or may be implemented by the processor. The processor may be an integrated circuit chip with signal processing capabilities. In the implementation process, various steps of the methods described above may be performed by an integrated logic circuit of hardware or a software instruction in the processor. The processor described above may be a general-purpose processor, a digital signal processor (DSP), or another programmable logic device, another separate gate or transistor logic device, another separate hardware component, or the like. The processor may implement or execute various methods, steps and logic block diagrams disclosed in the embodiments of the present disclosure. The general-purpose processor may be a microprocessor or any conventional processor. The steps of the methods disclosed in the embodiments of the present disclosure may be directly implemented by a hardware decoding processor, or may be implemented by a combination of hardware and software modules in the decoding processor. The software module may be disposed in a storage medium disposed in the memory. The processor reads information in the memory and implements the steps of the methods described above in combination with hardware of the processor.

In an exemplary embodiment, a data network information processing apparatus or terminal may be configured by one or more application specific integrated circuits (ASICs), DSPs, programmable logic devices (PLDs), complex programmable logic devices (CPLDs), field-programmable gate arrays (FPGAs), general-purpose processors, controllers, micro controller units (MCUs), microprocessors, or other electronic elements for executing the methods described above.

An embodiment of the present disclosure further provides a storage medium configured to store executable programs which, when being executed by a processor, implement steps described below:

sending uplink data by using an unlicensed resource; and in a case that the sending the uplink data by using the unlicensed resource fails, sending the uplink data by using a licensed resource.

In the embodiment of the present disclosure, the executable programs, when being executed by the processor, implement a step described below:

sending the uplink data by using the unlicensed resource in a manner of incremental target received power. A target received power of the uplink data in an (n+1)-th transmission is greater than a target received power of the uplink data in an n-th transmission, where n is a positive integer greater than or equal to 1.

In the embodiment of the present disclosure, the executable programs, when being executed by the processor, implement steps described below:

determining a current target received power of the uplink data with the following formula:

$$ReceivedTargetPower = InitialReceivedTargetPower + (TRANSMISSION\_COUNTER-1)*powerRampingStep;$$

where ReceivedTargetPower is the current target received power, InitialReceiveTargetPower is an initial target received power of the uplink data in a first transmission, TRANSMISSION_COUNTER is a serial number of a current transmission of the uplink data, and powerRampingStep is an incremental step of received power; and sending the uplink data according to the current target received power.

In the embodiment of the present disclosure, the executable programs, when being executed by the processor, implement a step described below:

receiving a system message, an RRC signaling or a dedicated message.

The system message, the RRC signaling or the dedicated message carries at least one of the initial target received power or the incremental step of received power.

The RRC signaling includes an RRC connection reconfiguration signaling, an RRC connection release signaling, an RRC connection setup signaling or an RRC connection reestablishment signaling.

In the embodiment of the present disclosure, the executable programs, when being executed by the processor, implement:

if a random access response sent by a base station and carrying uplink grant information is received after the uplink data is sent using the unlicensed resource, sending the uplink data by using the licensed resource indicated by the uplink grant information; or if a number of transmissions of the uplink data using the unlicensed resource reaches a preset number, re-initiating a random access and sending the uplink data is by using the licensed resource.

In the embodiment of the present disclosure, the executable programs, when being executed by the processor, implement a step described below:

receiving a system message, an RRC signaling or a dedicated message sent by the base station. The system message or the RRC signaling carries the preset number; and the RRC signaling includes an RRC connection reconfiguration signaling, an RRC connection release signaling, an RRC connection setup signaling or an RRC connection reestablishment signaling.

In the embodiment of the present disclosure, the executable programs, when being executed by the processor, implement a step described below:

in a case that a previous transmission of the uplink data using the unlicensed resource fails and has a transmit power reaching a power threshold, re-initiating the random access and sending the uplink data by using the licensed resource.

An embodiment of the present disclosure further provides a storage medium configured to store executable programs which, when being executed by a processor, implement steps described below:

sending a preamble sequence by using an unlicensed resource;

sending uplink data within a transmission time interval corresponding to a moment at which the preamble sequence is sent; and in a case that a random access response carrying uplink grant information is received within a preset period of time, re-sending the uplink data by using a licensed resource indicated by the uplink grant information.

In the embodiment of the present disclosure, the executable programs, when being executed by the processor, implement a step described below:

in a case that the random access response or a downlink notification sent by a base station is not received within the preset period of time, re-initiating a random access by using the unlicensed resource or the licensed resource, where the downlink notification is information sent by the base station in successful reception of the preamble sequence and the uplink data.

An embodiment of the present disclosure further provides a storage medium configured to store executable programs which, when being executed by a processor, implement steps described below:

detecting a preamble sequence sent by a terminal by using an unlicensed spectrum;

detecting uplink data sent by the terminal, where the uplink data is sent by the terminal within a transmission time interval corresponding to a moment at which the preamble sequence is sent;

in a case that the preamble sequence is correctly decoded and the uplink data is not correctly decoded, sending a random access response carrying uplink grant information to the terminal by using a licensed resource within a preset period of time. The uplink grant information is used for indicating the licensed resource scheduled to the terminal; and receiving the uplink data sent by the terminal on the licensed resource indicated by the uplink grant information.

It should be understood that the devices and the methods disclosed in the embodiments of the present application may be implemented in other ways. The device embodiments described above are merely illustrative. For example, the unit division is merely a logical function division, and, in practice, the unit division may be implemented in other ways. For example, multiple units or components may be combined or may be integrated into another system, or some features may be omitted or not executed. In addition, coupling, direct coupling or communication connections between the presented or discussed components may be indirect coupling or communication connections, via interfaces, between devices or units, and may be electrical, mechanical or in other forms.

The units described above as separate components may or may not be physically separated. Components presented as units may or may not be physical units, that is, may be located in one place or may be distributed over multiple network units. Part or all of these units may be selected according to practical requirements to achieve objects of the solutions in the embodiments of the present disclosure.

In addition, various function units in the embodiments of the present disclosure may all be integrated in one processing module, or each unit may be used as a separate unit, or two or more units may be integrated into one unit. The integrated unit may be implemented by hardware or may be implemented by hardware plus a software function unit.

It is understandable by those skilled in the art that all or part of the steps in the method embodiments described above may be implemented by hardware related to program instructions, these programs may be stored in a computer-readable storage medium, and, when being executed, these programs execute steps including the method embodiments described above. The preceding storage medium includes various media capable of storing program codes, such as a removable storage device, a ROM, a RAM, a magnetic disk or an optical disk.

The above are only specific embodiments of the present disclosure and are not intended to limit the scope of the present disclosure. Within the technical scope disclosed by the present disclosure, any change or substitution easily conceivable to those skilled in the art should fall within the protection scope of the present disclosure. Therefore, the protection scope of the present disclosure is subject to the protection scope of the claims.

INDUSTRIAL APPLICABILITY

The terminal sends the uplink data by using the unlicensed resource and in a case of sending the uplink data by using the unlicensed resource fails, sends the uplink data by using the licensed resource. The terminal sends the preamble sequence using the unlicensed resource, sends the uplink data within the transmission time interval corresponding to the moment at which the preamble sequence is sent; and in case of receiving the random access response carrying the uplink grant information within the preset period of time, re-sends the uplink data by using the licensed resource indicated by the uplink grant information. The base station detects the preamble sequence sent by using the unlicensed spectrum by the terminal and detects the uplink data sent by the terminal, and if the preamble sequence is correctly decoded and the uplink data is not correctly decoded, sends the random access response carrying the uplink grant information to the terminal by using the licensed resource within the preset period of time. In this way, a reception success rate of the uplink data can be improved.

What is claimed is:

1. An uplink data transmission method, applied to a terminal, comprising:
    sending uplink data by using an unlicensed resource; and
    sending the uplink data by using a licensed resource in a case that the sending the uplink data by using the unlicensed resource fails;
    wherein the sending the uplink data by using the licensed resource in the case that the sending the uplink data by using the unlicensed resource fails comprises:
        if a random access response send by a base station and carrying uplink grant information is received after the uplink data is sent by using the unlicensed resource, sending the uplink data by using the licensed resource indicated by the uplink grant information; or
        if a number of transmissions of the uplink data using the unlicensed resource reaches a preset number, re-initiating a random access and sending the uplink data on the licensed resource.

2. The uplink data transmission method of claim 1, wherein the sending the uplink data by using the unlicensed resource comprises:
    sending the uplink data by using the unlicensed resource in a manner of incremental target received power, wherein a target received power of the uplink data in an (n+1)-th transmission is greater than a target received power of the uplink data in an n-th transmission, wherein n is a positive integer greater than or equal to 1.

3. The uplink data transmission method of claim 2, wherein the sending the uplink data by using the unlicensed resource in the manner of incremental target received power comprises:
    determining a current target received power of the uplink data with the following formula:

ReceivedTargetPower=InitialReceivedTargetPower+(TRANSMISSION_COUNTER−1)*powerRampingStep;

wherein ReceivedTargetPower is the current target received power, InitialReceiveTargetPower is an initial target received power of the uplink data in a first transmission, TRANSMISSION_COUNTER is a serial number of a current transmission of the uplink data, and powerRampingStep is an incremental step of received power; and
    sending, according to the current target received power, the uplink data.

4. The uplink data transmission method of claim 3, further comprising:
    receiving a system message, a radio resource control (RRC) signaling or a dedicated message;
    wherein the system message, the RRC signaling or the dedicated message carries at least one of the initial target received power or the incremental step of received power; and
    wherein the RRC signaling comprises an RRC connection reconfiguration signaling, an RRC connection release signaling, an RRC connection setup signaling or an RRC connection reestablishment signaling.

5. The uplink data transmission method of claim 1, further comprising:
    receiving a system message, an RRC signaling or a dedicated message sent by the base station; wherein the system message or the RRC signaling carries the preset number, and the RRC signaling comprises an RRC connection reconfiguration signaling, an RRC connection release signaling, an RRC connection setup signaling or an RRC connection reestablishment signaling.

6. The uplink data transmission method of claim 1, wherein in a case that a transmission condition of the sending the uplink data by using the unlicensed resource satisfies a preset condition, the sending the uplink data by using the licensed resource further comprises:
    in a case that a previous transmission of the uplink data using the unlicensed resource fails and has a transmit power reaching a power threshold, re-initiating the random access and sending the uplink data by using the licensed resource.

7. An uplink data processing apparatus, comprising:
    a memory, configured to store executable programs; and
    a processor, configured to execute the executable programs stored in the memory to implement the uplink data transmission method of claim 1.

8. A non-transitory storage medium, configured to store executable programs which, when being executed by a processor, implement the uplink data transmission method of claim 1.

9. An uplink data transmission method, applied to a terminal, comprising:
    sending a preamble sequence by using an unlicensed resource;
    sending uplink data within a transmission time interval corresponding to a moment at which the preamble sequence is sent; and
    in a case that a random access response carrying uplink grant information is received within a preset period of time, re-sending the uplink data by using a licensed resource indicated by the uplink grant information.

10. The uplink data transmission method of claim 9, further comprising:
    in a case that the random access response or a downlink notification sent by a base station is not received within the preset period of time, re-initiating a random access by using the unlicensed resource or the licensed resource, wherein the downlink notification is information sent by the base station in successful reception of the preamble sequence and the uplink data.

11. An uplink data processing apparatus, comprising:
    a memory, configured to store executable programs; and
    a processor, configured to execute the executable programs stored in the memory to implement the uplink data transmission method of claim 9.

12. A non-transitory storage medium, configured to store executable programs which, when being executed by a processor, implement the uplink data transmission method of claim 9.

13. An uplink data transmission method, applied to a base station, comprising:
- detecting a preamble sequence sent by a terminal by using an unlicensed spectrum;
- detecting uplink data sent by the terminal, wherein the uplink data is sent by the terminal within a transmission time interval corresponding to a moment at which the preamble sequence is sent;
- in a case that the preamble sequence is correctly decoded and the uplink data is not correctly decoded, sending a random access response carrying uplink grant information to the terminal by using a licensed resource within a preset period of time, wherein the uplink grant information is used for indicating the licensed resource scheduled to the terminal; and
- receiving, on the licensed resource indicated by the uplink grant information, the uplink data sent by the terminal.

14. An uplink data processing apparatus, comprising:
a memory, configured to store executable programs; and
a processor, configured to execute the executable programs stored in the memory to implement the uplink data transmission method of claim 13.

15. A non-transitory storage medium, configured to store executable programs which, when being executed by a processor, implement the uplink data transmission method of claim 13.

* * * * *